United States Patent Office  
3,291,828  
Patented Dec. 13, 1966

1

3,291,828  
6-AMINO-6,7-DIHYDRO-5H-DIBENZO[a,c] CYCLOHEPTENES  
Katsumi Kotera, Mishima-gun, and Ryonosuke Kido, Toyonaka-shi, Osaka, Japan, assignors to Shionogi & Co., Ltd., Osaka, Japan  
No Drawing. Filed July 2, 1964, Ser. No. 380,081  
7 Claims. (Cl. 260—562)

The present invention relates to 6-substituted amino-6,7-dihydro-5H-dibenzo[a,c]cycloheptenes and production thereof. More particularly, it relates to 6-substituted amino-6,7-dihydro-5H - dibenzo[a,c]cycloheptenes represented by the formula:

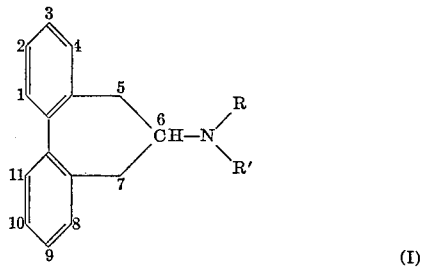

wherein R is hydrogen, lower alkyl (e.g. methyl, ethyl, propyl, butyl), lower alkenyl (e.g. allyl, butenyl) or di(lower)alkylamino(lower)alkyl (e.g. dimethylaminomethyl, dimethylaminoethyl, diethylaminoethyl, dimethylaminopropyl) and R′ is lower alkyl (e.g. methyl, ethyl, propyl, butyl), lower alkenyl (e.g. allyl, butenyl) or di(lower)alkylamino(lower)alkyl (e.g. dimethylaminomethyl, dimethylaminoethyl, diethylaminoethyl, dimethylaminopropyl), and production thereof.

A basic object of the present invention is to embody the 6-substituted amino-6,7-dihydro-5H-dibenzo[a,c]cycloheptene (hereinafter referred to as "6-substituted amino compound") (I). Another object of this invention is to embody the 6-substituted amino compound (I) having pharmacological activity. A further object of the invention is to embody a process for preparing the 6-substituted amino compound (I). These and other objects will be apparent to those conversant with the art to which the present invention pertains from the subsequent description.

The objective 6-substituted amino compound (I) can be prepared from known 6-oxo-6,7-dihydro-5H-dibenzo[a,c]cycloheptene (hereinafter referred to as "6-oxo compound") [J. Kenner et al.: J. Chem. Soc., vol. 99, p. 2101 (1911)] according to the following scheme:

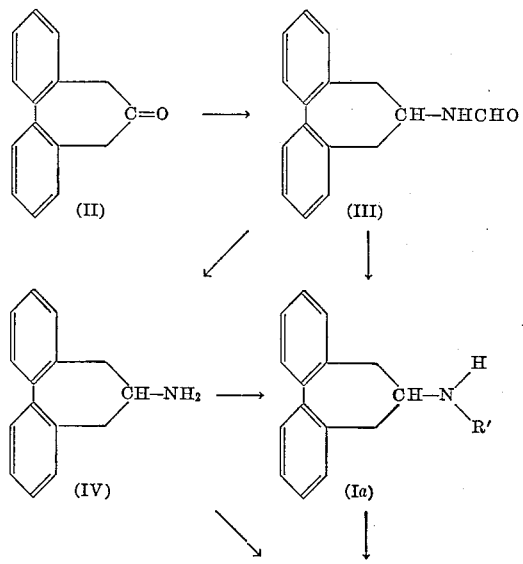

2

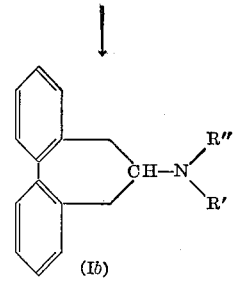

wherein R″ is lower alkyl (e.g. methyl, ethyl, propyl, butyl), lower alkenyl (e.g. allyl, butenyl) or di(lower)alkylamino(lower)alkyl (e.g. dimethylaminomethyl, dimethylaminoethyl, diethylaminoethyl, dimethylaminopropyl) and R′ has the same significance as designated above.

According to the present invention, the starting 6-oxo compound (II) is first subjected to formylamination. The formylamination may be effected by treating the 6-oxo compound (II) with formamide and/or ammonium formate in the presence or absence of formic acid. In place of formamide or ammonium formate itself, there may be used such a combination of compounds which can produce formamide or ammonium formate as formic acid and urea.

The resultant 6-formylamino-6,7-dihydro-5H-dibenzo[a,c]cycloheptene (hereinafter referred to as "6-formylamino compound") (III) is then subjected to hydrolysis. The hydrolysis may be carried out by treating the 6-formylamino compound (III) with a mineral acid, usually while heating.

Then, the resulting 6-amino-6,7-dihydro-5H-dibenzo[a,c]cycloheptene (hereinafter referred to as "6-amino compound") (IV) is subjected to alkylation, alkenylation or dialkylaminoalkylation. The reaction may be executed by treating the 6-amino compound (IV) with a reagent represented by the formula:

$$R'—X \qquad (V)$$

wherein X is halogen (e.g. chlorine, bromine) and R′ has the same significance as designated above in an inert solvent such as alkanol, acetone, aqueous alkanol, benzene and toluene, usually a temperature from room temperature (10 to 30° C.) to refluxing temperature. For smooth proceeding of the reaction, the use of an acid-eliminating agent such as sodium carbonate, potassium carbonate, sodium bicarbonate and potassium bicarbonate is preferred. When methylation is intended, there may be also used a combination of formic acid and formaldehyde in place of the said reagent (V).

As the result, there is obtained 6-monosubstituted amino-6,7-dihydro-5H-dibenzo[a,c]cycloheptene (hereinafter referred to as "6-monosubstituted amino compound") (Ia) or 6-disubstituted amino-6,7-dihydro-5H-dibenzo[a,c]cycloheptene (hereinafter referred to as "6-disubstituted amino compound") (Ib). When the former is obtained, it may be further subjected to alkylation, alkenylation or dialkylaminoalkylation in the same manner as illustrated above to give the 6-disubstituted amino compound (Ib).

Alternatively, 6 - methylamino-6,7-dihydro-5H-dibenzo[a,c]cycloheptene [Ia: R′=CH₃] can be prepared by subjecting the 6-formylamino compound (III) to reduction. The reduction may be accomplished by treating the 6-formylamino compound (III) with a metal hydride complex such as lithium aluminum hydride, sodium aluminum hydride and magnesium aluminum hydride in an inert solvent such as ether, tetrahydrofuran and dioxane, usually at a temperature between room temperature (10 to 30° C.) and refluxing temperature.

The thus prepared 6-substituted amino compounds (I), i.e. the 6-monosubstituted amino compound (Ia) and the 6-disubstituted amino compound (Ib), are generally liquid in the free state. For convenience on preparation, they may be converted into their acid addition salts, for instance, by treating the base with an acid such as hydrochloric, hydrobromic, hydroiodic, sulfuric, nitric, phosphoric, thiocyanic, carbonic, acetic, propionic, oxalic, citric, tartaric, succinic, salicyclic, benzoic or palmitic acid in a suitable solvent such as water, methanol, ethanol, benzene and toluene.

The 6-substituted amino compounds (I) and their non-toxic acid addition salts are useful as central nervous system depressing agents. For instance, 6-methylamino-6,7-dihydro-5H-dibenzo[a,c]cycloheptene hydrochloride produced inhibition of Sidman's avoidance conditioning reflux in rats by subcutaneous administration of the compound at a dose of 10 mg./kg. That compound also showed anti-electroshock activity with $ED_{50}$ (Effective Dose 50) of 39 mg./kg., when subcutaneously administered to mice. That compound further exhibited hypothermia activity and inhibitory motor activity in mice. Other 6-substituted amino compounds (I) and their non-toxic acid addition salts show the similar pharmacological activities.

Presently-preferred embodiments of the present invention are shown in the following examples.

Example 1

Preparation of 6 - formylamino - 6,7 - dihydro - 5H-dibenzo[a,c]cycloheptene (III): A mixture of 6-oxo-6,7-dihydro-5H-dibenzo[a,c]cycloheptene (1.02 g.), urea (4.60 g.) and 85% formic acid (9.21 g.) is gradually heated on an oil bath in nitrogen stream. The bath temperature is raised up to about 180 to 190° C. in about 1 hour, and heating is continued for 4.5 hours at the same temperature. After cooling, the reaction mixture is combined with water and shaken with benzene. The benzene layer is washed with 5% sodium carbonate solution and water in order, dried over anhydrous sodium sulfate and the benezene evaporated to give an yellow oil (1.22 g.). The oil is crystallized from benzene to give 6-formylamino - 6,7 - dihydro - 5H - dibenzo[a,c]cycloheptene (605 mg.) as prisms melting at 132.5 to 134° C. The crystallization mother liquor is chromatographed on neutral alumina (20 g.) and the eluate with benzene-chloroform (10:1, 5:1, 1:1) crystallized from benzene to give additional crystals (71 mg.) of the said compound.

Example 2

Preparation of 6-amino-6,7-dihydro-5H-dibenzo[a,c]-cycloheptene (IV): A mixture of 6-formylamino-6,7-dihydro-5H-dibenzo[a,c]cycloheptene (550 mg.) in 10% hydrochloric acid (15 ml.) is heated on an oil bath at 130 to 150° C. for 1 hour while refluxing. After cooling, water is eliminated from the reaction mixture by distillation under reduced pressure. The residue is crystallized from a small amount of water to give 6-amino-6,7-dihydro - 5H - dibenzo[a,c]cycloheptene hydrochloride (352 mg.) as needles melting at 256 to 258.5° C. The hydrochloride is readily converted into the free base by treating with sodium hydroxide in water.

Example 3

Preparation of 6 - methylamino - 6,7 - dihydro - 5H-dibenzo[a,c]cycloheptene (Ia: R'=CH$_3$): A solution of 6 - formylamino - 6,7 - dihydro - 5H - dibenzo[a,c]cycloheptene (600 mg.) in anhydrous ether (80 ml.) is dropwise added to a suspension of lithium aluminum hydride (600 mg.) in anhydrous ether (60 ml.) while stirring for about 1 hour, and the resultant mixture is stirred for 1 hour at room temperature (10 to 30° C.) and then refluxed for 2 hours. After adding a small amount of water to the reaction mixture, the ether layer is separated and the ether evaporated whereby 6-methylamino-6,7-dihydro-5H-dibenzo[a,c]cycloheptene (571 mg.) is obtained as an oil. The oil is treated with dilute hydrochloric acid to give 6 - methyl - amino - 6,7 - dihydro - 5H - dibenzo-[a,c]cycloheptene hydrochloride (551 mg.) as crystals melting at 273 to 276° C. (crystallized from ethanol).

Example 4

Preparation of 6 - dimethylamino - 6,7 - dihydro - 5H-dibenzo[a,c]cycloheptene (Ib: R'=CH$_3$, R''=CH$_3$): To 6 - amino - 6,7 - dihydro - 5H - dibenzo[a,c]cycloheptene (261 mg.), there are added 30% formaldehyde (99 mg.) and 85% formic acid (300 mg.) while cooling with ice, and the resultant mixture is heated for 3 hours in nitrogen stream while refluxing. To the resulting mixture, there are added 30% formaldehyde (0.1 ml.) and 85% formic acid (0.9 ml.), and refluxing is continued for 3 hours. After cooling, the reaction mixture is combined with 10% hydrochloric acid and shaken with ether. The water layer is made alkaline with sodium carbonate solution and shaken with ether. By removal of the ether from the ether layer, there is obtained 6-dimethylamino-6,7-dihydro-5H-dibenzo[a,c]cycloheptene (157 mg.) as a pale yellow oil. The oil is treated with dilute hydrochloric acid to give 6-dimethylamino-6,7-dihydro-5H-dibenzo[a,c]cycloheptene hydrochloride as prisms melting at 270 to 271° C. (decomp.) (crystallized from ethanol).

Example 5

Preparation of 6 - dimethylamino - 6,7 - dihydro - 5H-dibenzo[a,c]cycloheptene (Ib: R'=CH$_3$, R''=CH$_3$): To 6 - methylamino - 6,7 - dihydro - 5H - dibenzo[a,c]cycloheptene (110 mg.), there are added 30% formaldehyde (0.09 ml.) and 85% formic acid (0.31 ml.), and the resultant mixture is refluxed for 6 hours. The reaction mixture is concentrated under reduced pressure. The residue is combined with water, made alkaline with sodium carbonate solution and shaken with benzene. The benzene layer is washed with water, dried and the benzene removed by distillation under reduced pressure to give 6 - dimethylamino - 6,7 - dihydro - 5H - dibenzo[a,c]-cycloheptene (90 mg.) as an oil.

Example 6

Preparation of 6 - propylamino - 6,7 - dihydro - 5H - dibenzo[a,c]cycloheptene (Ia: R'=C$_3$H$_7$): A mixture of 6-amino - 6,7 - dihydro - 5H - dibenzo[a,c]cycloheptene (238 mg.), propyl bromide (168 mg.) and potassium carbonate (100 mg.) in anhydrous ethanol (4 ml.) is refluxed for 9 hours, and the resultant mixture is concentrated under reduced pressure. The residue is dissolved in ether, washed with water, dried and the ether evaporated. The oily residue (257 mg.) is dissolved in benzene and passed through alumina (8 g.). The eluate is evaporated to give 6 - propylamino - 6,7 - dihydro - 5H-dibenzo[a,c]cycloheptene (168 mg.) as an oil. The oil is treated with hydrobromic acid to give 6-propylamino-6,7-dihydro-5H-dibenzo[a,c]cycloheptene hydrobromide as needles melting at 204 to 205° C. (decomp.) (crystallized from acetone).

Example 7

Preparation of 6-propylamino-6-,7-dihydro-5H-dibenzo-[a,c]cycloheptene (Ia: R'=C$_3$H$_7$): In a sealed tube, a solution of 6-amino-6,7-dihydro-5H-dibenzo[a,c]cycloheptene (85 mg.) and propyl bromide (60 mg.) in anhydrous ethanol (2.5 ml.) is heated at 90° C. for 6 hours. The reaction mixture is treated as in Example 6 to give 6 - propylamino - 6,7-dihydro-5H-dibenzo[a,c]cycloheptene hydrobromide (33 mg.).

Example 8

Preparation of 6-allylamino-6,7-dihydro-5H-dibenzo-[a,c]cycloheptene (Ia: R'=CH$_2$CH=CH$_2$): A mixture of 6-amino-6,7-dihydro-5H-dibenzo[a,c]cycloheptene (310 mg.) and allyl bromide (211 mg.) in anhydrous benzene (7 ml.) is refluxed for 14 hours. The precipitated substance is eliminated by filtration. The filtrate is concentrated under reduced pressure. The residue is extracted with dilute hydrochloric acid. The extract is washed with benzene, made alkaline with sodium carbonate solution and shaken with ether. The ether layer is washed with water, dried and the ether evaporated. The residue is dissolved in a mixture of petroleum ether and benzene (1:1) and chromatographed on alumina (5 g.). From the eluate with petroleum ether-benzene (1:1), there is obtained 6-allylamino-6,7-dihydro-5H-dibenzo[a,c]cycloheptene (154 mg.) as an oil. The oil is dissolved in benzene and treated with dilute hydrobromic acid to give 6 - allylamino-6,7-dihydro-5H-dibenzo[a,c]-cycloheptene hydrobromide (144 mg.) as needles melting at 222 to 223° C. (decomp.) (crystallized from a mixture of acetone and methanol).

*Example 9*

Preparation of 6-(3-dimethylaminopropylamino)-6,7-dihydro-5H-dibenzo[a,c]cycloheptene (Ia: R′=CH$_2$CH$_2$CH$_2$N(CH$_3$)$_2$): 6 - amino-6,7-dihydro-5H-dibenzo[a,c]cycloheptene (510 mg.), 19.2% solution of 3-dimethylaminopropyl chloride in toluene (1.86 g.) and anhydrous potassium carbonate (300 mg.) are added to anhydrous ethanol (4 ml.), and the resultant mixture is heated in a sealed tube at 90° C. for 11.5 hours. After cooling, the reaction mixture is combined with water and concentrated under reduced pressure to distill out ethanol and toluene. The resultant mixture is extracted with benzene. The benzene extract is washed with water, dried and the benzene evaporated. The residue (510 mg.) is dissolved in benzene and chromatographed on activated magnesium silicate "Florisil" (20 g.). After recovery of the starting material (157 mg.) from the eluate with chloroform-methanol (50:1, 25:1, 10:1, 5:1), there is obtained 6-(3-dimethylamino-propylamino) - 6,7 - dihydro-5H-dibenzo[a,c]cycloheptene (254 mg.) as an oil from the eluate with chloroform-methanol (50:1, 25:1, 10:1, 5:1). The oil is dissolved in methanol and treated with a solution of oxalic acid in methanol to give 6-(3-dimethylamino-propylamino)-6,7-dihydro-5H-dibenzo[a,c]cycloheptene oxalate (260 mg.) as fine needles melting at 224 to 225° C. (decomp.) (crystallized from a mixture of ethanol and water).

What is claimed is:
1. A compound of the formula:

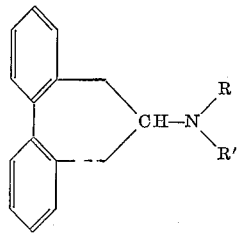

wherein R is a member selected from the group consisting of hydrogen, lower alkyl, lower alkenyl and di(lower)alkylamino(lower)alkyl and R′ is a member selected from the group consisting of lower alkyl, lower alkenyl and di(lower)alkylamino(lower)alkyl.

2. 6 - methylamino-6,7-dihydro-5H-dibenzo[a,c]cycloheptene.

3. 6-dimethylamino-6,7-dihydro-5H-dibenzo[a,c]cycloheptene.

4. 6 - propylamino-6,7-dihydro-5H-dibenzo[a,c]cycloheptene.

5. 6-allylamino-6,7-dihydro-5H-dibenzo[a,c]cycloheptene.

6. 6-(3-dimethylaminopropylamino)6,7-dihydro-5H-dibenzo[a,c]cycloheptene.

7. 6 - formylamino-6,7-dihydro-5H-dibenzo[a,c]cycloheptene.

References Cited by the Examiner

UNITED STATES PATENTS 3,052,721 9/1962 Bernstein et al. __ 260—570.8 X

OTHER REFERENCES

Cook et al.: "Journal Chemical Society," London, 1947, pages 746–50.

CHARLES B. PARKER, *Primary Examiner.*

ROBERT V. HINES, *Assistant Examiner.*